United States Patent
Sakaki et al.

[11] Patent Number: 5,807,942
[45] Date of Patent: Sep. 15, 1998

[54] POLYMERIZED PRODUCT OF PROTEIN AND PROCESS FOR PRODUCING IT

[75] Inventors: Shujiro Sakaki; Satoshi Yamada; Motohiro Mitani; Kenshiro Shuto; Yasumi Koinuma, all of Tsukuba, Japan

[73] Assignee: NOF Corporation, Tokyo, Japan

[21] Appl. No.: 657,557

[22] Filed: Jun. 4, 1996

[30] Foreign Application Priority Data

| Jun. 9, 1995 | [JP] | Japan | ................................. 7-143617 |
| Jun. 9, 1995 | [JP] | Japan | ................................. 7-143697 |
| Aug. 31, 1995 | [JP] | Japan | ................................. 7-224290 |

[51] Int. Cl.$^6$ .......................... C08H 1/00; C12N 11/02; C12N 11/08; C12N 11/06
[52] U.S. Cl. .................. 526/238.1; 435/177; 435/180; 435/181
[58] Field of Search ..................... 525/238.1; 435/17, 435/180, 181

[56] References Cited

U.S. PATENT DOCUMENTS

| 2,548,520 | 4/1951 | Damschroder et al. | ............. 526/238.1 |
| 3,314,905 | 4/1967 | Luce et al. | ............. 526/238.1 |
| 3,806,417 | 4/1974 | Beucamp et al. | ............. 435/180 |
| 4,511,478 | 4/1985 | Nowinski et al. | ............. 210/691 |
| 4,609,707 | 9/1986 | Nowinski et al. | ............. 525/54.1 |
| 4,711,840 | 12/1987 | Nowinski et al. | ............. 435/7.7 |
| 4,749,511 | 6/1988 | Lad et al. | ............. 510/114 |
| 4,749,647 | 6/1988 | Thomas et al. | ............. 435/5 |
| 4,752,638 | 6/1988 | Nowinski et al. | ............. 525/54.1 |
| 4,829,098 | 5/1989 | Hoffman et al. | ............. 522/5 |
| 4,843,010 | 6/1989 | Nowinski et al. | ............. 525/54.1 |
| 4,859,753 | 8/1989 | Gallot et al. | ............. 526/238.1 |
| 5,034,428 | 7/1991 | Hoffman et al. | ............. 522/5 |
| 5,401,633 | 3/1995 | Sutton et al. | ............. 435/6 |
| 5,482,996 | 1/1996 | Russell et al. | ............. 525/54.1 |

FOREIGN PATENT DOCUMENTS 597510  5/1994  European Pat. Off. .

*Primary Examiner*—Jon P. Weber
*Attorney, Agent, or Firm*—Flynn, Thiel, Boutell & Tanis, P.C.

[57] ABSTRACT

A polymerized product of protein, comprising a polymer of one or more protein-containing monomers represented by the general formula $$P_r-[(Y)_k-(X)_m-R^1]_n \quad (1)$$

wherein $R^1$ represents a polymerizable group capable of causing a radical polymerization, $P_r$ denotes a protein residue, Y denotes a group formed from a functional group in said protein and the functional group $R_2$ of the modifying agent given below, X denotes an organic divalent radical, k is zero or 1, m is zero or 1 and n is a numeral of 1 or higher, said protein-containing monomer being obtained by reacting a protein with a modifying agent represented by the general formula, $$R^2-(X)_m-R^1 \quad (2)$$

wherein $R_2$ represents a functional group capable of combining with a functional group of protein and $R^1$, X and m are as given above.

7 Claims, No Drawings

5,807,942

POLYMERIZED PRODUCT OF PROTEIN AND PROCESS FOR PRODUCING IT

FIELD OF THE INVENTION

The present invention relates to a polymerized product of protein, which is a high molecular weight polymer of at least one protein, such as an enzyme and an immunologically active substance, and to a process for producing it.

BACKGROUND OF THE INVENTION

For contact lenses, the so-called hard contact lens of which the principal component consists of a copolymer of methylmethacrylate and a silicon-containing methacrylate, on the one hand, and the so-called soft contact lens of which the principal component consists of a copolymer of 2-hydroxyethyl methacrylate and methacrylic acid, on the other hand, have found wide use. The hard contact lens is apt to suffer from staining by adhesion of secretory substances in the tear fluid (proteins and lipids) thereon due to the high affinity of the silicon-containing methacrylate to proteins and lipids. When, therefore, a hard contact lens is put on a human eye over a long period of time, it becomes stained by proteins, lipids, cosmetic components, etc., to cause a clouding of the lens, whereby a decrease in the visual activity and ophthalmic disorders may be brought about. Even for the moisture sorptive soft contact lens, it may suffer from adhesion of secretory substances of the tear fluid thereon and may be polluted by bacteria and microbes, whereby a clouding of the lens and an ophthalmic disorder may be brought about.

Heretofore, for excluding any pollution of contact lens, it has been practiced to use, as a rinsing agent, a protease for a protein pollution, a surfactant for a lipid pollution and an abrasive for an adhesion pollution. A rinsing agent containing a surfactant and an abrasive provides a wash-away effect for specific pollutants, nevertheless, it has problems in that the washing effect is insufficient and that flaws in the lens may occasionally be caused.

In Japanese Patent Kokai No. 31834/1975, a rinsing liquid containing a protease is disclosed. This rinsing liquid has a problem in that the enzyme activity will fade away after standing for 24 hours in a form of an aqueous solution, since the durability of an enzyme activity is limited. Moreover, many of the existing rinsing liquids contain a builder, a carboxylic acid and so on and exhibit a stimulative action on the eye, so that improvement thereof is desired.

In Japanese Patent Kokai No. 9506/1994, a rinsing agent for contact lens in which a serine protease and an anionic surfactant are compounded in glycerol is disclosed. In Japanese Patent Kokai No. 159822/1988, a rinsing agent for contact lens is disclosed, in which a protease is dispersed in polyethylene glycol. These rinsing agents have a problem in that the enzyme activity decreases upon dilution.

On the other hand, it has also been widely practiced in recent years to detect immunologically active substances, such as the specific proteins etc., appearing in a living body in relation with an affected disease by utilizing their corresponding immunological reactions (antigen-antibody reactions) to serve for the diagnosis of the disease. For the determination by means of an antigen-antibody reaction, there have been developed various techniques including the so-called radioimmunoassay (RIA), enzyme immunoassay (EIA), fluoroimmunoassay (FIA), latex turbidimetry and turbidity immunoassay (TIA). RIA, EIA and FIA require separation of the reaction product resulting from the antigen-antibody reaction and, thus, necessitate, in general, a time-consuming and bothersome procedure, but despite this, have found a wide use due to their superior performances in quantitative assaying, etc.

In recent years, the techniques of turbidimetry and nephelometry, both being based on the observation of change of an optical property upon an antigen-antibody reaction, have come to be noticed. These techniques consist in the observation of change in the turbidity of the reaction mixture by an adequate means, such as light scattering photometer, absorptiometer or the like, since, in a reaction of an antibody (or an antigen) with a substance to be detected, the change in the turbidity value of the reaction mixture from the commencement to the end of the reaction is brought about in response to the change in the mass of the substance to be detected. While turbidimetry and nephelometry are simple and convenient in operation as compared with RIA, EIA and FIA, they have a problem in that the determination may difficultly be realized at a high sensitivity with better reproducibility.

In order to solve such problems, a technique of latex turbidimetry was proposed, which employs latex particles to serve as a carrier for supporting thereon either an antibody or an antigen. This technique requires a complicated operation due to the necessity of supporting the antibody or antigen on the carrier particles.

Also, an assay reagent for turbidimetry containing additives, such as a coagulation assistant etc., is known. For example, Japanese Patent Kokai No. 101121/1976 discloses an immunological assay reagent containing an immunologically active substance, polyethylene glycol and a non-ionic surfactant and having an HLB value of 0.7–1.7. Japanese Patent Kokai No. 43362/1984 discloses an immunological assay reagent containing an immunologically active substance and a surfactant having a specific molecular structure.

When using these additive-containing assay reagent for the assay of an immunologically active substance, there occur problems in that a determination error is brought about due to the occurrence of a so-called non-specific reaction which forms additional turbidity by any other substance than the objective substance co-existing in the sample mixture, that a so-called pro-zone phenomenon may occur, in which the measurement will result in a lower observed concentration in spite of the presence of a high actual concentration of the objective substance to be examined, and that the observed values become inaccurate in the region of lower concentration.

Therefore, it has been expected to develop a novel immunological assay reagent capable of assaying an immunologically active substance at a high sensitivity with better reproducibility and to establish a technique for such assay.

In the Japanese technical journal "Yuki-Gousei Kagaku (organic synthetic chemistry)", Vol. 42, No. 4, 283–292 (1984), a method for preparing a modified protein having a reactivity by selectively modifying a protein using a modifying agent, such as N-(m-benzoyloxy)succinimide, is disclosed. The resulting modified protein is contemplated for use in an enzyme immunoassay by making use of its reactivity, after it is further labelled by an enzyme. No suggestion is given therein for the polymerization of the modified protein molecules together.

SUMMARY OF THE INVENTION

An object of the present invention is to provide a polymerized product of protein, which is a high molecular weight polymer of at least one protein and still exhibits the intrinsic properties of the protein.

Another object of the present invention is to provide a polymerized product of one or more enzymes, which can be stored in a stable state while maintaining the activity of the enzyme at a high degree, even if it is left not only in a dried state but also in a solution for long term storage.

A further object of the present invention is to provide a polymerized product of an immunologically active substance or a co-polymerized product of an immunologically active substance/enzyme, which is a high molecular weight polymer still retaining the intrinsic properties of the immunologically active substance or of the immunologically active substance/enzyme to cause quite specifically an antigen-antibody reaction with a corresponding immunologically active counter substance.

A still further object of the present invention is to provide a process for producing a polymerized product of protein such as above in an efficient way.

The polymerized product of protein according to the present invention comprises a polymer of one or more protein-containing monomers represented by the general formula $$P_r\text{—}[(Y)_k\text{—}(X)_m\text{—}R^1]_n \qquad (1)$$

wherein $R^1$ represents a polymerizable group capable of causing a radical polymerization, $P_r$ denotes a protein residue, Y denotes a group formed from a functional group in said protein and the functional group $R^2$ of the modifying agent given below, X denotes an organic divalent radical, k is zero or 1, m is zero or 1 and n is a numeral of 1 or higher, said protein-containing monomer being obtained by reacting a protein with a modifying agent represented by the general formula $$R^2\text{—}(X)_m\text{—}R^1 \qquad (2)$$

wherein $R^2$ represents a functional group capable of combining with a functional group of protein and $R^1$, X and m are as given above.

The process for producing a polymerized product of protein according to the present invention comprises reacting a protein with a modifying agent represented by the general formula (2), $$R^2\text{—}(X)_m\text{—}R^1 \qquad (2)$$

wherein $R^1$ represents a polymerizable group capable of causing a radical polymerization, $R^2$ represents a functional group capable of combining with a functional group of protein, X denotes an organic divalent radical and m is zero or 1, to obtain a protein-containing monomer represented by the general formula (1), $$P_r\text{—}[(Y)_k\text{—}(X)_m\text{—}R^1]_n \qquad (1)$$

wherein $P_r$ denotes a protein residue, Y denotes a group formed from a functional group in said protein and the functional group $R^2$, X and $R^1$ are as defined above, k is zero or 1, m is as defined above and n is a numeral of 1 or higher, and polymerizing one or more such protein-containing monomers.

DETAILED DESCRIPTION OF THE INVENTION

In the context of the present invention, the word "polymerized product" or "polymer" means "homopolymer and/or copolymer". The word "immunologically active substance" means "antibody and/or antigen". The word "polymerized product of immunologically active substance" means "homopolymer and/or copolymer of antibody and/or antigen". The word "(meth)acryl" means "acryl and/or methacryl".

The polymerized product of protein according to the present invention is a polymer of one or more protein-containing monomers represented by the general formula (1). Here, as the protein constituting the protein-containing monomer, there may be employed enzymes, antibodies, antigens and other immunologically active substances.

The polymerized product of protein according to the present invention has a structural unit represented by the general formula (3)

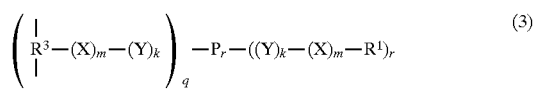

in which $R^3$ denotes a group formed from $R^1$ of the general formula (1) by a radical polymerization and, therefore, is a residue of $R^1$, q is a numeral of 1 or higher, r is a numeral of zero or higher, wherein q+r amounts to n of the general formula (1), and $P_r$, $R^1$, X, Y, m and k have the same meaning as those of the general formula (1).

For the polymerizable group $R^1$ capable of being subjected to a radical polymerization appearing in the general formulae (1) and (2), no special limitation is placed, so long as it contains a group containing an unsaturated bond capable of causing radical polymerization. Concrete examples for the group $R^1$ include acryloyl, methacryloyl, maleimido, styryl and vinyl, among which, a group containing an ethylenically unsaturated bond, such as acryloyl, methacryloyl, maleimido or styryl, capable of causing the monomers represented by the general formula (1) to combine easily with each other into a homopolymer or with another comonomer into a copolymer, is preferred.

For the divalent organic residue represented by X in the general formulae (1) and (2), there is no special limitation. Concrete examples of X include amido, ester, thioester, ether, alkylene, oxyalkylene, polyoxyalkylene, alkylene urethane and sulfonyl groups.

The functional group $R^2$ in the general formula (2) has an ability to chemically combine with the functional groups of the protein. Specifically, there is no limitation for the group $R^2$ with the proviso that it can combine with the functional groups present in the protein, such as hydroxyl, carboxyl, amino and aldehydo. Concrete examples of the group $R^2$ include hydroxyl, carboxyl, aldehydo, amino, mercapto, succinimidyloxy-carbonyl, imidoester group, halogenonitroallyl, pyridinosulfido, maleimido, phthalimidothio, halogeno-methylcarbonyl, halogenocarbonyl, halogenosulfonyl, nitroazidophenyl, diazotrifluoroacetyl and isocyanato. Among them, groups capable of easily reacting with the amino group in the enzyme or the immunologically active substance to produce a protein-containing monomer represented by the general formula (1), such as succinimidyloxycarbonyl, isocyanato, halogenocarbonyl and halogenosulfonyl, are preferred.

In the general formulae (1) and (2), m is zero or 1.

As specific modifying agents represented by the general formula (2), the following may be exemplified: For the modifying agent in which the polymerizable group $R^1$ is (meth)acryloyl, there may be exemplified (meth)acrylic acid, (meth)acrolein, (meth)acrylic acid chloride, (meth)acryloyl isocyanate, (meth)acryloyloxyethyl isocyanate, 2-hydroxyethyl (meth)acrylamide, 2-hydroxyethyl (meth)

acrylate, 6-[(meth)acryloylamino]caproic acid and 3-[(meth)-acryloylamino]propionic acid. Among them, those which can easily react with the enzyme or the immunologically active substance to produce the protein-containing monomer represented by the general formula (1), such as (meth)acrylic acid chloride and (meth)acryloyl isocyanate, are preferred.

For the modifying agent in which the polymerizable group $R^1$ is maleimido, there may be exemplified N-(6-maleimidocaproyloxy)succinimide, N-(4-maleimidobutyryloxy)succinimide, N-(8-maleimidocapryloxy) succinimide, N-(11-maleimidoundecanoyl)succinimide, sodium salt of N-(6-maleimidocaproyloxy)succinimide, sodium salt of N-(4-maleimidobutyryloxy)sulfosuccinimide, sodium salt of N-(8-maleimidocapryloxy)sulfosuccinimide, sodium salt of N-(11-maleimidoundecanoyl)sulfosuccinimide, N,N'-oxydimethylene dimaleimide, N,N'-o-phenylene dimaleimide, N,N'-p-phenylene dimaleimide, succinimidyl 4-(N-maleimidomethyl)cyclohexane-1-carboxylate, sulfosuccinimidyl 4-(N-maleimidomethyl)cyclohexane-1-carboxylate, m-maleimidobenzoyl-N-hydroxysuccinimide ester, m-maleimidobenzoyl-N-hydroxysulfosuccinimide ester, succinimidyl 4-(p-maleimidophenyl)-butyrate and sulfosuccinimidyl 4-(p-maleimidophenyl)-butyrate. Among them, those which exhibit a solubility in water and can easily react with the enzyme or the immunologically active substance to produce the protein-containing monomer represented by the general formula (1), such as the sodium salt of N-(6-maleimido-caproyloxy) sulfosuccinimide, sodium salt of N-(4-male-imidobutyryloxy) sulfosuccinimide, sodium salt of N-(8-maleimidocapryloxy)sulfosuccinimide and sodium salt of N-(11-maleimidoundecanoyl) sulfosuccinimide, are preferred.

For the modifying agent in which the polymerizable group $R^1$ is styryl, there may be exemplified carboxystyrene, formylstyrene, hydroxystyrene, aminostyrene, styrene carboxylic acid chloride and styrene sulfochloride. Among them, those which can easily react with the enzyme or the immunologically active substance to produce the protein-containing monomer represented by the general formula (1), such as styrene carboxylic acid chloride and styrene sulfochloride, are preferred.

For the protein (hereinafter denoted sometimes as the subject substance) to be reacted with the modifying agent represented by the general formula (2), enzymes, immunologically active substances and so on may be employed. For the enzyme to be employed according to the present invention, there is no special limitation with the proviso that it consists of a peptide or a protein having reactive functional groups, such as hydroxyl, carboxyl, amino and aldehydo resulting from a ring opening of saccharide chains, and exhibiting a biocatalytic activity. Concrete examples of the enzyme include hydrolases, oxidoreductases, transferases, eliminating enzymes, isomerases and synthetases.

Specific examples of the hydrolase include peptide hydrolases, such as protease etc.; esterases, such as lipase, phospholipase, alkali phosphatase and acetylcholinesterase; sucrases, such as β-D-galactosidase, amylase, glucoamylase, cellulase, hemicellulase, saccharase and pectinase; and others including glucose oxidase, glucose-6-phosphate dehydrogenase, hexokinase, penicillinase, peroxidase and lysozyme.

Commercial enzymes can also be employed, for example, Bioprase (trademark, a peptide hydrolase, marketed from K.K. Nagase Seikagaku-Kogyo) and Lipase-Saiken (trademark, an esterase, marketed from K.K. Nagase Seikagaku-Kogyo). No limitation is placed on the origins of the enzymes and enzymes of whatever origins, for example, bacillus etc., can be employed.

For applying the polymerized product of enzyme according to the present invention to a pollutant scavenging agent for contact lens described afterwards, a hydrolases, in particular, peptide hydrolases and/or esterases are employed preferably as the enzyme. On the other hand, for applying the copolymeric product of the immunologically active substance/enzyme according to the present invention to an assay reagent for assaying immunologically active substances described afterwards, alkali phosphatases, β-D-galactosidase and peroxidases conventionally used universally in enzyme immunoassay are preferable for the enzyme.

The immunologically active substance to be reacted with the modifying agent represented by the general formula (2) should have reactive functional group(s), such as hydroxyl, carboxyl, amino or aldehydo resulting from ring opening of various saccharide chains, and can serve as an antibody or an antigen. For these subject substances, there may be employed, for example, antibodies against serum proteins, such as C-reactive protein (CRP), rheumatoid factor (RF) and transferrin; antibodies against hormones of, for example, thyroid-stimulating hormone (TSH), triiodothyronine ($T_3$), thyroxine ($T_4$), thyroxine binding protein (TBG), thyroglobulin, insulin, estriol ($E_3$), human chorionic gonadotropin (HCG) and human placental lactogen (HPL); antibodies against tumor-associated substances, such as canceroembryonal antigen (CEA), $B_2$-microglobulin and α-fetoprotein (AFP); antigens and antibodies against antibodies and antigens of viral hepatitis, such as HBs antigen, HBs antibody, HBe antigen and HBe antibody; antigens and antibodies against viruses of mumps, herpes, measles, rubella and citomegalo, or biological components including anti-AIDS antibody (HIV); antibodies against chemicals, such as phenobarbital, acetaminophen, salicylic acid and cyclosporin; proteins, such as enzymes; and antibodies against enzymes. The enzyme as the immunologically active substance is employed as a protein having immunological activity but not as a protein having biocatalytic activity. Thus, the enzyme as an immunologically active substance does not serve for bringing forth any enzymatic activity. The above recited antigens or antibodies against the antibodies or antigens serve as the immunologically active substance for the objective to be assayed in the assay method or as that of the assay reagent for assaying an immunologically active counter substance (objective substance), as described afterwards.

By reacting such a protein as an enzyme or an immunologically active substance (the subject substance) with the modifying agent represented by the general formula (2), they combine together through the reaction between the reactive functional groups in the protein and the reactive functional group in the modifying agent, whereby the protein-containing monomer represented by the general formula (1) is obtained.

The group denoted by P in the general formula (1) is the residue of the subject substance of the above-mentioned enzyme or immunologically active substance.

The group denoted by Y in the general formula (1) is a group (bond) formed from a functional group in the subject substance and the functional group ($R^2$) in the modifying agent. Specifically, the group Y may consist of, for example an amide bond, dicarbamide bond, urea bond, urethane bond, disulfide bond, imide acid amide bond and 3-thiosuccinimide bond (a bond formed by reacting maleimide group with thiol group).

The figure n in the general formula (1) is a number of at least 1, preferable 1–100, more preferably 1–10, though depending on the kind of the protein. When n exceeds over 100, problems may occur, for example, in that the enzymatic activity or the immunological activity may decrease, though depending on the kind of the protein. The number n in the synthesized protein-containing monomer can be detected by quantitatively analyzing the functional groups in the protein-containing monomer. Thus, the number n in the case where the functional group is an amino group can be determined by quantitatively analyzing the amino groups in the protein before the reaction with the modifying agent and those in the protein-containing monomer after the synthesis thereof, wherefrom the proportion of the modified amino groups in the synthesized monomer is calculated and the number n is determined therefrom.

The reaction of the protein of the enzyme or of the immunologically active substance with the modifying agent represented by the general formula (2) can be performed, for example, in the manner as follows: First, the protein is dissolved in a solvent consisting of, for example, phosphate buffer, carbonate buffer, acetate buffer, tris/hydrochloric acid buffer or physiological saline. Separately herewith, the modifying agent is dissolved in a solvent consisting of, for example, water, methanol, ethanol, propanol, dimethylformamide, tetrahydrofuran or a mixture of two or more of them. Then, the so-obtained modifying agent solution is admixed with the above-mentioned protein solution and the mixture is subjected to reaction at a reaction temperature of 0°–50° C., preferably 4°–25° C., for 15 minutes to 24 hours, preferably 1–12 hours. The reaction product can be used without purification as a solution of the protein-containing monomer as such or, if necessary, can be refined by an appropriate method, such as dialysis, salting out or gel filtration.

The so-obtained protein-containing monomer represented by the general formula (1) can easily be polymerized, since it includes a polymerizable group $R^1$ capable of performing radical polymerization. The protein-containing monomer can serve, therefore, as a monomer for producing the polymerized product of protein according to the present invention.

When an enzyme is employed for the protein (subject substance) for preparing the protein-containing monomer represented by the general formula (1), one can obtain an enzyme-containing monomer represented by the general formula (1-1).

$$E-[(Y^1)_k-(X)_m-R^1]_n \quad (1\text{-}1)$$

in which E denotes the residue of the enzyme, $Y^1$ denotes the group formed from the functional group in the enzyme and the functional group $R^2$ in the modifying agent and X, k, m, $R^1$ and n have the same meanings as those in the general formula (1).

When an immunologically active substance is employed for the subject substance, an immunologically active substance-containing monomer is obtained, which is represented by the general formula (1-2),

$$A-[(Y^2)_k-(X)_m-R^1]_n \quad (1\text{-}2)$$

in which A denotes the residue of the immunologically active substance, $Y^2$ denotes the group formed from the functional group in the immunologically active substance and the functional group $R^2$ in the modifying agent and X, k, m, $R^1$ and n have the same meanings as those in the general formula (1).

The polymerized product of protein according to the present invention is obtained by subjecting one or more protein-containing monomers represented by the general formula (1), more particularly, one or more enzyme-containing monomers represented by the general formula (1—1) and/or immunologically active substance-containing monomers represented by the general formula (1–2) and so on, to a radical polymerization. Thus, the polymerized product of protein according to the present invention can exist as a homopolymer obtained by polymerizing one single kind of protein-containing monomer, as a copolymer obtained by polymerizing two or more kinds of protein-containing monomers or as a copolymer obtained by co-polymerizing one or more kinds of protein-containing monomers with other monomer(s). For co-polymerizing two or more kinds of protein-containing monomers, it is either possible to co-polymerize two or more kinds of enzyme-containing monomers with each other or to co-polymerize two or more kinds of immunologically active substance-containing monomers with each other or, further, to co-polymerize one or more kinds of enzyme-containing monomers with one or more immunologically active substance-containing monomers.

Thus, by selecting appropriate protein-containing monomers to be polymerized or co-polymerized, polymerized products of an enzyme, of an immunologically active substance, of an immunologically active substance/enzyme and so on can be obtained. When another comonomer is incorporated in the copolymer, the stability of the enzyme activity can be increased, so that it is desirable to additionally include other comonomer(s) than the protein-containing monomer for the polymerized enzyme product.

For the other comonomers to be co-polymerized with the protein-containing monomer, there is no special limitation placed thereon and every comonomer capable of causing radical copolymerization can be employed therefor. Specific examples of such other comonomers include (meth)acrylic esters, such as butyl (meth)acrylate, methyl (meth)acrylate, ethyl (meth)acrylate, hexyl (meth)acrylate and 2-hydroxyethyl methacrylate; and vinyl monomers such as (meth)acrylic-amide, N-hydroxy(meth)acrylic amide, N,N-dialkyl(meth)-acrylic amide, N,N-dialkylaminoethyl(meth) acrylic amide, (meth)acrylic acid, polyethylene glycol mono (meth)-acrylate, pyrrolidone, styrene, α-methylstyrene, sodium styrenesulfonate, vinyl chloride, vinylidene chloride, ethylene, propylene, isobutylene, vinyl acetate, vinyl propionate, ethyl vinyl ether, n-butyl-vinyl ether, diethyl itaconate and di-n-butyl itaconate. In addition, styrene derivatives may be employed, for example, those in which methyl or a halogen, such as chlorine etc., is substituted on a benzene ring. They can be incorporated either solely or in a mixture of two or more of them. Among these other comonomers, water-soluble vinyl comonomers are preferred.

The polymerization degree of the polymerized product of protein according to the present invention may usually be 2–1,000, preferably 3–1,000, and more preferably 3–100. The molecular weight of the polymerized product of protein is not able to be defined by a generalized limitation, since it depends also on the kind of protein to be incorporated. However, the average molecular weight may usually be, for example, in an approximate range of 30,000–1,000,000 for the enzyme-containing polymerized product, 300,000–1,000,000 for the antibody-containing polymerized product and 700,000–10,000,000 for the antibody/β-D-galactosidase-containing co-polymerized product.

While the proportion of the protein-containing monomer in the polymerized product of protein according to the present invention is not specifically limited, it may be, in general, in a proportion of 0.01–100 mole %, preferably 0.1–90 mole %, with the other comonomer(s) being present in a proportion of 0–99.99 mole %, preferably 10–99.9 mole %.

For the case where the polymerized product is an immunologically active substance/enzyme co-polymerized product, the mole ratio of the immunologically active substance/the enzyme may be 1/3 to 1/10,000, preferably 1/5 to 1/1,000.

The polymerized product of protein according to the present invention comprises the structural unit represented by the foregoing general formula (3). Here, the group $R^3$ in the general formula (3) is derived from the group $R^1$ in the general formula (1) by the radical polymerization of the protein-containing monomer represented by the general formula (1). Namely, the group $R^3$ is formed from the group $R^1$ by the radical polymerization through the polymerizable unsaturated bond contained in the group $R^1$. Specific examples of the group $R^3$ include those given below, though are not restricted thereto:

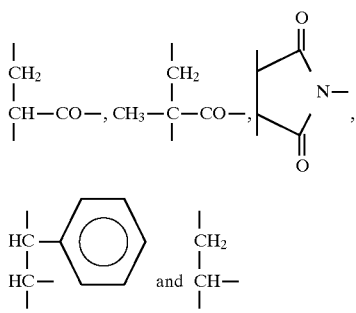

The above are the groups derived from acryloyl, methacryloyl, maleimido, styryl and vinyl (these have already been exemplified for $R^1$), respectively in order.

The polymerized product of protein according to the present invention can be produced by, for example, causing radical polymerization of one or more protein-containing monomers represented by the general formula (1) together with, if necessary, other comonomer(s) in the presence of an initiator.

For the initiator, the usual radical polymerization initiators can be employed without any limitation. As specific examples thereof, there may be enumerated 2,2'-azobisisobutyronitrile (AIBN), benzoyl peroxide, diisopropyl peroxydicarbonate, tert-butyl peroxy-2-ethyl-hexanoate, tert-butyl peroxypivalate, tert-butyl peroxydiisobutyrate, 2,2'-azobis[2-(5-methyl-2-imidazolin-2-yl)propane] dihydro-chloride, 2,2'-azobis[2-(2-imidazolin-2-yl)propane] di-hydrochloride, 2,2'-azobis[2-(4,5,6,7-tetrahydro-1H-1,3-diadipin-2-yl)propane]dihydrochloride, 2,2'-azobis[2-(3,4,5,6-tetrahydropyrimidin-2-yl)propane]dihydro-chloride, peroxysulfates and peroxysulfate/bisulfite salt. The amount of the initiator to be employed may desirably be in the range of 0.01–10 parts by weight, preferably 0.1–5 parts by weight per 100 parts by weight of the total monomers.

On producing the polymerized product of protein, it is possible to incorporate a polymerization regulator, such as an alkyl mercaptan, an alkyl dithiol or the like. Specific examples thereof include ethyl mercaptan, mercaptoethanol, mercaptoacetic acid, aminoethanethiol and ethanedithiol. The amount of the polymerization regulator employed may desirably be 0.01–100 parts by weight, preferably 0.1–10 parts by weight, per 100 parts by weight of the total monomers.

The polymerization may preferably be carried out in a reaction medium which does not deteriorate the activity of the occluded protein. As the reaction medium, there may be exemplified a buffer solution, such as a phosphate buffer, carbonate buffer, acetate buffer or TRIS/HCl buffer; water; and an organic solvent, such as methanol, ethanol, propanol, tert-butanol, benzene, toluene, dimethylformamide, tetrahydrofuran and chloroform. The organic solvent may preferably be used as a mixture with a buffer solution in such an amount that the concentration thereof will be in the range not causing deactivation of the activity of the enzyme or of the immunologically active substance, for example, 0.1–40% by volume.

The polymerization may desirably be carried out after the reaction system has been displaced by an inert gas, such as nitrogen, argon or helium. The polymerization may desirably be effected under the conditions of a polymerization temperature of 15°–70° C., preferably 20°–60° C., and a polymerization duration of 2–72 hours, preferably 5–36 hours. The polymerization degree (or the polymer molecular weight) can be adjusted by selecting the polymerization temperature, polymerization duration, kind of initiator and its amount, kind of polymerization regulator and its amount and so on.

After the polymerization, the resulting product may be refined, if necessary, by an adequate method, such as dialysis, salting out or gel filtration.

The polymerized product of enzyme obtained by (co) polymerizing one or more enzyme-containing monomers represented by the general formula (1-1) in the manner as above can be used as a pollutant removing agent for contact lens adaptively.

For the pollutant removing agent for contact lens, it is possible to use the polymerization reaction liquor of the polymerized product of protein as such or to use the product after it has been refined by, such as dialysis, salting out or gel filtration. Since the pollutants on contact lens are constituted mainly of proteins and/or lipids, the polymerization product of enzyme to be used as the pollutant removing agent may preferably consist of a polymer or a copolymer containing a peptide hydrolase, an esterase or both a peptide hydrolase and esterase. It is possible to incorporate one single enzyme or a combination of two or more of enzymes.

In the pollutant removing agent for contact lens according to the present invention, other component(s) than the polymerized product of protein may be incorporated, such as those which are employed in conventional pollutant removing agents or rinsing liquors for contact lens. As the other components, there may be employed, for example, surfactants, isotonizing agents, antiseptics, chelating agents and pH-regulators. As the surfactant, any surfactant of cationic, anionic, nonionic or amphoteric nature can be incorporated. As preferred surfactants, there may be enumerated nonionic and neutral surfactants, such as polyethylene glycol esters, polyethylene glycol ethers, polypropylene glycols and polyethylene glycols. As the isotonizing agents, there may be enumerated, for example, inorganic salts, such as sodium chloride and potassium chloride. As the chelating agents, there may be enumerated, for example, ethylenediamine tetraacetic acid (EDTA), its alkali metal salts, citric acid and succinic acid.

The pollutant removing agent for contact lens containing the polymerized product of an enzyme can be stored in a dry state in the form of powder or a tablet, which can be dissolved in an adequate medium for preparing an application solution, or can be formulated from the start as an application solution. Even in the state of solution, the pollutant removing agent according to the present invention maintains its pollutant removing performance (washing-off ability) for long periods of time, since the occluded enzyme is polymerized and held in a stabilized state so that the enzyme activity does not deteriorate but is kept high. The pollutant removing performance (washing-off ability) is therefore high and subject to almost no deterioration, even if the pollutant removing agent is stored in the form of a solution for long term, so that its storage stability is excellent.

For removing pollutants on a contact lens using the removing agent containing the polymerized product of an enzyme according to the present invention, it is only necessary to immerse the contact lens in a solution of the removing agent or, in the case where the removing agent is present in a dry state or as a concentrated solution, to first prepare a dilute solution of the removing agent in an adequate buffer solution or isotonic solution or in the preservation solution for the lens and, then, soak the lens therein for about 15–120 minutes. Here, heating may be incorporated. A rubbing wash of the lens may be permissible, though the pollutants may in many cases be removed efficiently by a chemical decomposition by the action of the enzyme without necessitating a rubbing wash of the lens. After the pollutant has been removed, the lens can be put on the eye after being rinsed with an adequate rinsing liquid.

The polymerized product of an immunologically active substance obtained by polymerizing one or more immunologically active substance-containing monomers represented by the general formula (1-2) in the manner described previously can be used advantageously as an immunologically active substance assay reagent for assaying both qualitatively and quantitatively an antibody or an antigen. Also the immunologically active substance/enzyme co-polymerized product obtained by co-polymerizing an immunologically active substance-containing monomer represented by the general formula (1-2) with an enzyme-containing monomer represented by the general formula (1-1) can be used adaptively as an immunologically active substance assay reagent for qualitatively or quantitatively assaying an antibody or an antigen. Such an immunologically active substance assay reagent may consist solely of the polymerized product of immunologically active substance or of the co-polymerized product of immunologically active substance/enzyme obtained as above or, alternatively, may contain other additive(s). The assay reagent containing the polymerized product of immunologically active substance or the co-polymerized product of immunologically active substance/enzyme may either be stored in a dry state in the form of solid or powder, from which an application solution is prepared upon application, or be formulated as an application solution from the start.

As the additives mentioned above, those which are conventionally employed in an assay reagent based on an antigen-antibody reaction may be employed without limitation. Specifically, there may be enumerated, for example, surfactants, such as sodium dodecyl sulfate, Tween 20 (trademark, a product of ICI) and polyethylene glycols; and organic solvents, such as methanol, ethanol, acetone, N,N'-dimethylformamide and tetrahydrofuran.

As the medium for dissolving the polymerized product of immunologically active substance or the co-polymerized product of immunologically active substance/enzyme, any liquid capable of dissolving them without deteriorating their activities can be used unlimitedly. Specific examples of this medium include buffer solutions, such as phosphate buffers, carbonate buffers, acetate buffers and TRIS/HCl buffer; water; and mixtures of these buffer solutions or water with an organic solvent, such as methanol, ethanol, propanol, tert-butanol, benzene, toluene, dimethylformamide, tetrahydrofuran or chloroform, for example, a mixed liquid having a content of the organic solvent of 0.1–40% by volume.

In the case where the immunologically active substance assay reagent is in the form of a solution, the concentration of the polymerized product of an enzyme or the co-polymerized product of an immunologically active substance/enzyme may desirably be 0.001–100 mg/ml, preferably 0.01–10 mg/ml.

No special restriction is placed on the assay system for assaying the substance to be examined and techniques known per se can be employed, such as radioimmunoassay, enzyme immunoassay, fluoroimmunoassay, turbidimetry and nephelometry.

Among these, turbidimetry, in which the light permeating through the reaction liquor is observed, and nephelometry, in which the intensity of scattered light is determined, are preferred for the case where the polymerized product of an immunologically active substance is employed. In the case of using an immunologically active substance/enzyme copolymer, enzyme immunoassay is employed preferably. Commonly to all assay systems, the sample containing the objective immunologically active substance to be assayed is brought into contact with the assay reagent containing the polymerized product of an immunologically active substance or the co-polymerized product of an immunologically active substance/enzyme to cause an antigen-antibody reaction between the immunologically active substance or the immunologically active substance/enzyme fixed on the polymeric product in the reagent and the objective immunologically active substance in the sample, whereupon the resulting reaction product is assayed by an assay technique pertinent to each specific assay system employed, whereby a quantitative or qualitative assay of the objective immunologically active substance in the sample can be achieved.

The concentration of the polymerized product of an immunologically active substance or the co-polymerized product of an immunologically active substance/enzyme in the reaction system of the antigen-antibody reaction may be in the range of 1 ng/ml–100 mg/ml, preferably 10 ng/ml–10 mg/ml, and the reaction temperature therefor may be in the range of 0°–70° C., preferably 4°–40° C. in which the immunologically active substance or the immunologically active substance/enzyme in the polymeric product and the objective immunologically active substance in the sample will not be deactivated. The reaction system may desirably exhibit a pH of 2–13, preferably 4–11. The reaction duration may desirably be 0.1 minute–1 hour, preferably 1–20 minutes.

For the reaction medium, the same buffer solutions, water and mixtures of these buffers with organic solvents as exemplified for preparing the assay reagent solution may be used. The reaction system may contain additives which may be the same as those for the assay reagent.

When turbidimetry or nephelometry is employed for the assay system, the antigen-antibody reaction product can be assayed by observing the turbidity or the scattered light intensity of the reaction mixture after the reaction using a known means, such as a turbidimeter or an absorptiometer. Here, the turbidity or the scattered light intensity can be determined with better reproducibility at a high sensibility, since the immunologically active substance in the assay reagent is present densely in the polymerized high molecular weight product. Therefore, it is possible to dispense with the procedure of supporting the immunologically active substance on a carrier of plastic or the like as practiced in conventional techniques.

In the case of an assay system using enzyme immunoassay, the antigen-antibody reaction product is assayed as in the prior art enzyme immunoassay by making use of the enzyme activity. Usually, the assay is performed in such a way, that a substrate for the enzyme is added to the sample to cause the enzyme-substrate reaction and the amount of the resulting reaction product is determined. Specifically, methods of, for example, absorptiometry, fluorometry and chemiluminescence analysis may be used. As the substrate for the enzyme, those which are used in the conventional enzyme immunoassay or in determination of enzymes can be employed. Specific examples therefor include 1,2-phenylenediamine, 3,3',5,5'-tetramethylbenzidine and so on for peroxidase; 2-nitrophenyl-β-D-galactoside, 4-hydroxyphenylacetic acid, disodium salt of 4-methoxy-4-(3-galactosidephenyl)spiro(1, 2-dioxetane-3,2'-adamantane), 3-(4-hydroxyphenyl) propionic acid and so on for β-D-galactosidase; and 4-nitrophenyl phosphate, 4-methylumbelliferyl β-D-galactoside, 4-methylumbelli-feryl phosphate, disodium salt of 4-methoxy-4-(3-phosphatophenyl)spiro(1,2-dioxetane-3, 2'-adamantane) and so on for alkali phosphatase.

The procedures for assaying an objective substance by means of enzyme immunoassay are explained specifically for the case of employing a titer plate widely used also in conventional techniques of enzyme immunoassay, with reference to the following reaction scheme (4).

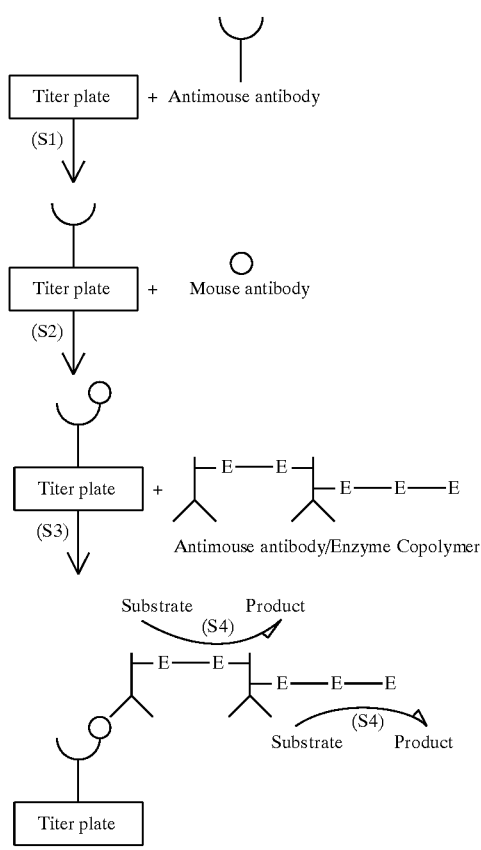

(4)

The above reaction scheme (4) illustrates the reactions in the assay schematically, wherein a titer plate used in the conventional techniques of enzyme immunoassay, for example, Maxisorp F96 (trademark) titer plate of polystyrene marketed from the firm NUNC is employed for assaying a mouse antibody. Here, the assay is effected on four stages (S1) to (S4) as shown in the reaction scheme (4):

1) First, an effective amount of an anti-mouse antibody is placed in each well on the titer plate, to cause the anti-mouse antibody to be fixed on the titer plate by physical adsorption (S1).
2) Then, the sample containing a mouse antibody as the objective substance to be assayed is added thereto either as such or after dilution with an adequate solvent, in order to cause an antigen-antibody reaction to form a complex of an antigen/antibody (S2).
3) Subsequently, the immunologically active substance assay reagent containing the co-polymerized product of an immunologically active substance/enzyme consisting of a copolymer of the anti-mouse antibody and the enzyme (anti-mouse antibody/enzyme-copolymer) is added thereto to subject the complex of an antigen/antibody of above 2) to an antigen-antibody reaction with the anti-mouse antibody/enzyme-copolymer to thereby form a complex of an antigen/antibody/antimouse antibody/enzyme-copolymer fixed on the titer plate (S3).
4) Finally, unreacted anti-mouse antibody/enzyme-copolymer is removed by washing and each well is then soaked by a solution containing a large excess of a substrate for the enzyme, whereby the substrate is decomposed by the enzyme in the composite product fixed on the titer plate (S4). Then, the resulting reaction product of this enzyme-substrate reaction is assayed by an appropriate method based on, for example, absorptiometry, fluorometry or chemiluminescence analysis. Here, the amount of the enzyme available for the reaction for a unit amount of the mouse antibody is far greater than that in the prior analysis technique, since the enzyme is present in a densely enriched state in the polymerized product, so that the amount of the reaction product of the enzyme-substrate reaction is quite large, which results in a large determination value upon the assay by, for example, absorptiometry and, thus, the detection sensibility is greatly increased. Here, it is possible to attain a quantitative analysis of the mouse antibody in the sample by preparing preliminarily a calibration curve for quantitative analysis, by performing the assay using a series of known amounts of the mouse antibody and plotting each assayed value on a graph.

Thus, using the co-polymerized product of the immunologically active substance/enzyme according to the present invention, an assay of an objective immunologically active substance can be achieved with high sensitivity, since the amount of the enzyme coupled with a unit amount of the objective substance is much larger than that in the conventional assay techniques, whereby correspondingly greater amounts of the reaction product is produced from the substrate per unit time, resulting in a higher assayed value by an absorptiometry, so that an assay with high sensitivity can be attained. For the other assay methods detecting the enzyme activity, the same assay result with high detection sensitivity can be obtained. Therefore, by employing the co-polymerized immunologically active substance/enzyme according to the present invention, it is made possible to analyze an objective substance existing in such a low concentration that cannot be analyzed by a prior technique of enzyme immunoassay. Moreover, it becomes now possible to decrease the time required for the enzymatic reaction, since the amount of the reaction product produced from the substrate per unit time is greater. Furthermore, by the use of the co-polymerized product of immunologically active substance/enzyme according to the present invention, the assay of an objective substance can be realized by simple procedures within a short period of time without necessitating bothersome preliminary procedures for preparing an enzyme-labelled antigen or antibody as in the prior techniques.

As detailed above, the polymerized product of protein according to the present invention retains one or more specific proteins in a polymer obtained by a radical polymerization of one or more protein-containing monomers represented by the general formula (1) without losing the intrinsic properties of the protein. In the polymerized product of protein in which the protein is an enzyme, almost no deterioration in the enzyme activity is brought about after it has been stored for a long time, even in the form of a solution, since the enzyme is held in the polymerized product in a state in which the enzyme activity is maintained at a high level. Therefore, the polymerized product of enzyme according to the present invention is adapted for application to a pollutant scavenger for contact lens.

The polymerized product of protein in which the protein is an immunologically active substance retains the immunologically active substance therein in such a state that its specific ability of causing an antigen-antibody reaction quite specifically with an objective substance (i.e. a corresponding immunologically active counter substance) is maintained, so that it is subjected to a corresponding antigen-antibody reaction easily and specifically with the immunologically active counter substance to form a high molecular weight reaction product. Accordingly, the polymerized product of immunologically active substance can be employed for an immunologically active substance assay reagent with high assay sensibility and superior reproducibility. Here, it is unnecessary to support the polymerized product of immunologically active substance on a carrier or the like nor to isolate the reaction product and, therefore, the assay of the objective substance can be performed by a simple operation with high sensibility and superior reproducibility. Such advantageous effects are revealed at the most when turbidimetry or nephelometry is employed for the assay system.

The co-polymerized product of immunologically active substance/enzyme in which the protein is a combination of an immunologically active substance and an enzyme is a copolymer in which the immunologically active substance and the enzyme are retained therein in such a state that the intrinsic ability of the immunologically active substance in the starting monomer for causing an antigen-antibody reaction quite specifically with the objective substance, on the one hand, and the substrate specificity and the high activity of the enzyme in the starting enzyme-containing monomer, on the other hand, are maintained in the copolymer. Accordingly, the co-polymerized product of the immunologically active substance/enzyme causes an antigen-antibody reaction quite easily in an objective-specific manner with the objective immunologically active counter substance to produce a reaction product having a high content of the enzyme. The co-polymerized product of the immunologically active substance/enzyme according to the present invention can, therefore, be used as the essential component of an assay reagent for assaying an immunologically active substance exhibiting a high assay sensitivity with a superior reproducibility, since it can bring about a greater amount of an enzyme-substrate reaction product as compared with the conventionally employed assay reagents. Such advantageous effects are revealed at the most when enzyme immunoassay is employed for the assay system.

Furthermore, by the process for producing a polymerized product of protein according to the present invention, a protein-containing monomer represented by the general formula (1) is first synthesized by reacting a protein with a modifying agent represented by the general formula (2) and the resulting protein-containing monomer is then subjected to a radical polymerization, whereby the polymerized product of protein can be obtained efficiently.

PREFERRED EMBODIMENT OF THE INVENTION

Below, the present invention will be described in detail by way of Examples and Comparative Examples, which are given only for the exemplification of the invention and do not restrict the scope of the invention.

EXAMPLE 1-1

Preparation of Maleimido-Modified BIOPRASE

A solution of Bioprase (trademark, a product of Nagase Seikagaku-Kogyo K.K., with a molecular weight of about 27,000) of a concentration of 50 mg/ml was prepared by dissolving Bioprase in a buffer solution of 100 mM sodium carbonate/sodium bicarbonate (pH 9.0). Separately, N-(6-maleimidocaproyloxy)succinimide (EMCS: trademark, a product of the firm Dojin Chemical) was dissolved in dimethylformamide to obtain a solution of modifying agent with a concentration of 50 mg/ml. 68.5 µl of this modifying agent solution were admixed with 1,200 µl of the above-mentioned Bioprase solution to cause a reaction at 4° C. for 12 hours. By the reaction of the free amino group in the Bioprase with the succinimidyloxycarbonyl group in the modifying agent, the modifying agent was introduced into Bioprase through amido bonds.

After the reaction, the reaction liquor was subjected to fractionation by passing it through a column (column size: 13 mm inner diameter×390 mm) filled with Sephadex-G25 (trademark, a product of the firm Pharmacia LKB Biotechnology), which was equilibrated by a buffer solution of 100 mM disodium hydrogenphosphate/sodium dihydrogenphosphate (pH 6), at a flow rate of 0.5 ml/min (fraction volume=1.0 ml/fraction). By observing the absorbance of each fraction at 280 nm, the peaks for the maleimido-modified Bioprase and for the unreacted modifying agent, respectively, were confirmed. Collecting the Nos. 22–33 fractions, the maleimido-modified Bioprase represented by the following formula (5) was obtained:

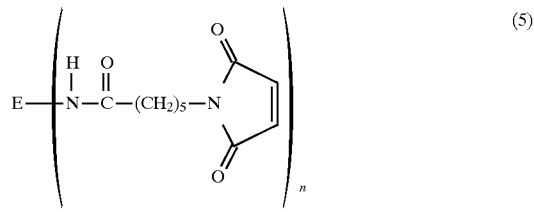

(in which E represents the residue of Bioprase and n is a numeral of 4.1)

The proportion (modifying degree in %) of formation of amido bond by the free amino groups in Bioprase with the succinimidyloxycarbonyl groups in the modifying agent was determined by the method of quantitative assay of free amino groups [Analytical Biochemistry, 14, 328–336 (1966)]. Here, a glycine solution was employed as the standard solution and the modifying degree of unmodified Bioprase was taken to be zero %. It was found thereby that the modifying degree is 45.8% and n is 4.1.

The maleimido-modified Bioprase was subjected to a sodium dodecyl sulfate-polyacrylamide gel electrophoresis (SDS-PAGE). By comparing the molecular weight of the maleimido-modified Bioprase with that of the unmodified Bioprase, it was confirmed that no molecular multiplication of the maleimido-modified Bioprase due to association, polymerization or the like had occurred.

EXAMPLE 1-2

Preparation of Methacryloyl-modified Bioprase

A solution of a modifying agent of a concentration of 25 mg/ml was obtained by dissolving methacryloyloxy-ethyl isocyanate in dewatered 1,4-dioxane. In the same manner as in Example 1-1, except that 16.7 μl of the above modifying agent solution were employed instead of the modifying agent solution of Example 1-1, a methacryloyl-modified Bioprase represented by the following formula (6) was obtained:

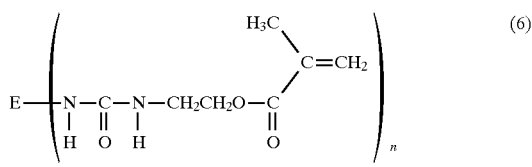

(in which E represents the residue of Bioprase and n is a numeral of 3.8)

By determining the modifying degree of this methacryloyl-modified Bioprase in the same manner as in Example 1-1, the value was found to be 42.7% and n was 3.8. By comparing the molecular weight of the methacryloyl-modified Bioprase with that of the unmodified Bioprase, it was confirmed that no molecular multiplication of the methacryloyl-modified Bioprase due to association, polymerization or the like had occurred.

EXAMPLE 1-3

Preparation of Acryloyl-Modified Bioprase

A solution of a modifying agent of a concentration of 25 mg/ml was obtained by dissolving acrylic acid chloride in dewatered 1,4-dioxane. In the same manner as in Example 1-1, except that 40.2 μl of the above modifying agent solution were employed instead of the modifying agent solution of Example 1-1, an acryloyl-modified Bioprase represented by the formula (7) given below was obtained. By determining the modifying degree of this acryloyl-modified Bioprase in the same manner as in Example 1-1, the value was found to be 41.9% and n was 3.8. By comparing the molecular weight of the acryloyl-modified Bioprase with that of the unmodified Bioprase, it was confirmed that no molecular multiplication of the acryloyl-modified Bioprase due to association, polymerization or the like had occurred.

(in which E represents the residue of Bioprase and n is a numeral of 3.8)

EXAMPLE 1-4

Preparation of Maleimido-Modified LIPASE-SAIKEN

A maleimido-modified Lipase-Saiken represented by the formula (8) given below was obtained in the same manner as in Example 1-1, except that Lipase-Saiken (trademark, a product of Nagase Seikagaku-Kogyo K.K., molecular weight 30,000) was used instead of Bioprase of Example 1-1 and that the modifying agent solution was used in an amount of 61.6 μl. By determining the modifying degree of this maleimido-modified Lipase-Saiken in the same manner as in Example 1-1, the value was found to be 39.8% and n was 2.2. By comparing the molecular weight of the maleimido-modified Lipase-Saiken with that of the unmodified Lipase-Saiken, it was confirmed that no molecular multiplication of the maleimido-modified Lipase-Saiken due to association, polymerization or the like had occurred.

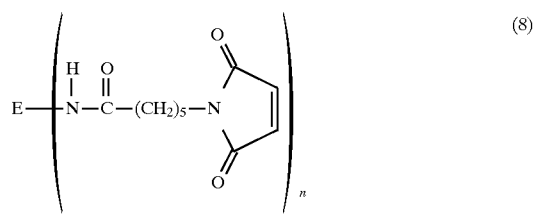

(in which E represents the residue of Lipase-Saiken and n is a numeral of 2.2)

EXAMPLE 2-1

By dissolving the maleimido-modified Bioprase prepared in Example 1-1 in a buffer solution of 100 mM disodium hydrogenphosphate/sodium dihydrogenphosphate (pH 6.0), a solution of Bioprase monomer of a concentration of 25 mg/ml was obtained. Separately, methacrylamide as the other comonomer was dissolved in the phosphate buffer mentioned above to obtain a methacrylamide solution of a concentration of 160.0 mg/ml. Further, a solution of 2,2'-azobis[2-(2-imidazolin-2-yl)-propane]dihydrochloride as the radical polymerization initiator of a concentration of 7.2 mg/l was prepared by dissolving it in the phosphate buffer mentioned above.

To 800 μl of the above Bioprase monomer solution, 100 μl of the above methacrylamide solution and 100 μl of the above initiator solution were admixed. The resulting mixed liquor was incubated in the dark under nitrogen atmosphere at 35° C. for 3 days while shaking, to effect copolymerization of the Bioprase monomer and methacrylamide. After the reaction, the reaction liquor was subjected to dialysis against 100 ml of physiological saline at 4° C. in the dark to remove the initiator.

After the dialysis, the dialyzed reaction liquor was assayed on a column composed of two segments filled with TSK-GEL G4000SWXL (trademark, a product of the firm TOSOH) and with TSK-GEL G3000SWXL (trademark, a product of the firm TOSOH), respectively, connected in series in this order. Namely, a sample of the dialyzed reaction liquor was passed through the column which had been equilibrated with a buffer solution of 0.3M NaCl and 50 mM disodium hydrogenphosphate/sodium dihydrogenphosphate (pH 7.0), under the condition of a flow rate of 1.0 ml/min, a column temperature of 40° C., a sample volume of 50 μl and a sample concentration of 1.0 mg/ml, whereby a peak was confirmed at a portion above ferritin (MW=440,000) and below thyroglobulin (MW=669,000), proving that a Bioprase-copolymer was produced.

EXAMPLE 2-2

The same procedures were pursued as in Example 2-1 except that the methacryloyl-modified Bioprase monomer prepared in Example 1-2 was used in the place of the maleimido-modified Bioprase monomer, whereby a peak was confirmed at a portion above ferritin (MW=440,000) and below thyroglobulin (MW=669,000), proving that a Bioprase-copolymer was produced.

EXAMPLE 2-3

The same procedures were pursued as in Example 2-1 except that the acryloyl-modified Bioprase monomer prepared in Example 1–3 was used in the place of the maleimido-modified Bioprase monomer and that 100 μl of acrylamide solution of a concentration of 133.6 mg/ml was used in the place of the methacrylamide solution, whereby a peak was confirmed at a portion above ferritin (MW=440,000) and below thyroglobulin (MW=669,000), proving that a Bioprase-copolymer was produced.

EXAMPLE 3-1

By dissolving the maleimido-modified Bioprase prepared in Example 1-1 in a buffer solution of 100 mM disodium hydrogenphosphate/sodium dihydrogenphosphate (pH 6.0), a solution of Bioprase monomer of a concentration of 25 mg/ml was obtained. Separately, a solution of 2,2'-azobis[2-(2-imidazolin-2-yl)propane] dihydrochloride as the radical polymerization initiator of a concentration of 2.0 mg/ml was prepared by dissolving it in the phosphate buffer mentioned above.

To 800 µl of the above Bioprase monomer solution, 200 µl of the above initiator solution were admixed and the resulting mixed liquor was incubated in the dark under a nitrogen atmosphere at 35° C. for 3 days while shaking, to effect polymerization of the Bioprase monomer. After the reaction, the reaction liquor was subjected to dialysis against 100 ml of physiological saline at 4° C. in the dark to remove the initiator.

After the dialysis, the dialyzed reaction liquor was assayed in the same manner as in Example 2-1, whereby a peak was confirmed at a portion above catalase (MW=232,000) and below ferritin (MW=440,000), proving that a Bioprase-polymer was produced.

EXAMPLE 3-2

The same procedures were pursued as in Example 3-1 except that the acryloyl-modified Bioprase monomer prepared in Example 1–3 was used in the place of the maleimido-modified Bioprase monomer, whereby a peak was confirmed at a portion above catalase (MW=232,000) and below ferritin (MW=440,000), proving that a Bioprase-polymer was produced.

EXAMPLE 4-1

The same procedures were pursued as in Example 2-1 except that a mixed solution composed of 800 µl of the Bioprase monomer solution and 800 µl of the Lipase-Saiken monomer solution was used as the enzyme monomer solution and that the amounts of the methacrylamide solution and of the initiator solution were both changed to 200 µl, whereby a peak was confirmed at a portion above ferritin (MW=440,000) and below thyroglobulin (MW=669,000), proving that an enzyme-copolymer containing co-polymerized Bioprase and Lipase-Saiken was produced.

EXAMPLE 4-2

The same procedures were pursued as in Example 3-1 except that a mixed solution composed of 800 µl of the Bioprase monomer solution and 800 µl of the Lipase-Saiken monomer solution was used as the enzyme monomer solution and that the amount of the initiator solution was changed to 400 µl, whereby a peak was confirmed at a portion above catalase (MW=232,000) and below ferritin (MW=440,000), proving that an enzyme-copolymer containing co-polymerized Bioprase and Lipase-Saiken was produced.

EXAMPLE 5-1

A pollutant removing liquor for contact lens was prepared by dissolving the enzyme-copolymer obtained in Example 2-1 in a physiological saline so as to reach a concentration of 0.4% by weight. A contact lens stained by a protein pollutant was soaked in this pollutant removing liquor and the cleaning was effected by keeping the lens still therein. The cleaning effect was evaluated visually after 2 hours' immersion on a criterion of judging almost complete removal of the stained protein for "better" and all other cases for "inferior". The results are summarized in Table 1. The contact lens stained by protein was prepared in such a way that a contact lens [Super EXI (trademark) of the firm Seiko Contact Lens] was immersed in an artificial tear fluid (prepared by dissolving 0.6 g of albumin, 0.3 g of globulin, 0.2 g of lysozyme and 0.1 g of mucin in physiological saline to fill up to 100 ml) with heating at 65° C. to cause deposition of the proteins on the lens.

The enzymatic activity of the protease of the pollutant removing liquor was estimated directly after the preparation of the pollutant removing liquor and after 14 weeks therefrom (preserved at 40° C.) by the casein-Folin method. The results are recited also in Table 1.

EXAMPLES 5-2 to 5-7

The procedures of Example 5-1 were followed except that an enzyme-polymer or enzyme-copolymer obtained in Example 2-2 (Example 5-2), Example 2-3 (Example 5-3), Example 3-1 (Example 5-4), Example 3-2 (Example 5-5), Example 4-1 (Example 5-6) or Example 4-2 (Example 5-7) was used instead of the enzyme-copolymer of Example 2-1. The results are recited in Table 1.

COMPARATIVE EXAMPLE 1

The procedures of Example 5-1 were followed except that non-polymerized original Bioprase was used instead of the enzyme-copolymer of Example 2-1. The results are recited in Table 1.

TABLE 1

| Example No. | Activity of[*1] Protease (%) | Cleaning Effect |
|---|---|---|
| Ex. 5-1 | 100 | better |
| Ex. 5-2 | 98 | better |
| Ex. 5-3 | 95 | better |
| Ex. 5-4 | 97 | better |
| Ex. 5-5 | 97 | better |
| Ex. 5-6 | 98 | better |
| Ex. 5-7 | 94 | better |
| Comp. Ex. 1 | Not detectable | inferior |

[*1]% of the enzymatic activity after 14 weeks to that directly after the preparation of the removing liquor.

From the results of Table 1, it is seen that the cleaning effect is better for the pollutant removing liquors in the inventive Examples using the enzyme-polymer and enzyme-copolymers and that the enzymatic activity shows almost no decrease after a prolonged storage in a state of an aqueous solution and is maintained at a high value.

EXAMPLE 6-1

Preparation of Maleimido-Modified Antibody

A solution of an antibody of a concentration of 50 mg/ml was prepared by dissolving a goat anti-C-reactive protein antibody (Goat Anti CRP IgG, MW=ca. 150,000; in the following, C-reactive protein is denoted sometimes by CRP) in 100 mM sodium carbonate/sodium bicarbonate (pH 9.0). Separately, N-(6-maleimidocaproyloxy) succinimide (EMCS: trademark, a product of Dojin Chemical) was dissolved in dimethylformamide to obtain a solution of modifying agent of a concentration of 50 mg/ml. 23.1 µl of this modifying agent solution were admixed as the modifying agent with 1,200 µl of the above-mentioned antibody solution and the mixture was incubated in the dark at 4° C. for 12 hours to thereby cause the reaction of the free amino group in the antibody with the succinimidyl-oxycarbonyl group in the modifying agent, in order to introduce the modifying agent into the antibody through an amido bond.

After the reaction, the reaction liquor was subjected to fractionation by passing it through a column (column size: 13 mm inner diameter×390 mm) filled with Sephadex-G25 (trademark, a product of the firm Pharmacia LKB Biotechnology), which was equilibrated by a buffer solution of 100 mM disodium hydrogenphosphate/sodium dihydrogenphosphate (pH 6.0), at a flow rate of 0.5 ml/min (fraction volume=1.0 ml/fraction). By observing the absorbance of each fraction at 280 nm, the peaks for the maleimido-modified goat anti-C-reactive protein antigen and for the unreacted modifying agent, respectively, were confirmed. By collecting the Nos. 22–33 fractions, the maleimido-modified goat anti-C-reactive protein antibody represented by the following formula (9) was obtained:

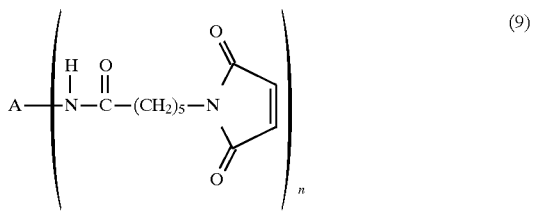

(in which A represents the residue of goat anti-CRP antibody and n is a numeral of 7.3)

The proportion of formation of amido bond by the free amino groups in the antibody with the succinimidyloxycarbonyl groups in the modifying agent (modifying degree in %) was determined by the method of quantitative assay of free amino group [Analytical Biochemistry, 14, 328–336 (1966)]. Here, a glycine solution was employed as the standard solution and the modifying degree of unmodified antibody was taken to be zero A. It was determined thereby that the modifying degree is 8.1% and n is 7.3.

The maleimido-modified goat anti-C-reactive protein antibody was subjected to a sodium dodecyl-sulfate-polyacrylamide gel electrophoresis (SDS-PAGE). By comparing the molecular weight of the maleimido-modified goat anti-C-reactive protein antibody with that of the unmodified goat anti-C-reactive protein antibody, it was confirmed that no molecular multiplication of the maleimido-modified goat anti-C-reactive protein antibody due to association, polymerization, or the like had occurred.

EXAMPLE 6-2

Preparation of Methacryloyl-modified Antibody

By dissolving methacryloyloxyethyl isocyanate in dewatered 1,4-dioxane, a solution of a modifying agent of a concentration of 25 mg/mi was obtained. In the same manner as in Example 6-1, except that 16.7 µl of this modifying agent solution were employed instead of the modifying agent solution of Example 6-1, a methacryloyl-modified goat anti-C-reactive protein antibody represented by the following formula (10) was obtained:

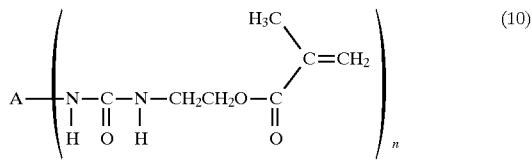

(in which A represents the residue of goat anti-C-reactive protein antibody and n is a numeral of 7. 0)

By determining the modifying degree of this methacryloyl-modified antibody in the same manner as in Example 6-1, the value was found to be 7.8% and n was 7.0. By comparing the molecular weight of the methacryloyl-modified antibody with that of the unmodified antibody, it was confirmed that no molecular multiplication of the methacryloyl-modified antibody due to association, polymerization or the like had occurred.

EXAMPLE 6-3

Preparation of Acryloyl-Modified Antibody

By dissolving acrylic acid chloride in dewatered 1,4-dioxane, a solution of a modifying agent of a concentration of 25 mg/ml was obtained. In the same manner as in Example 6-1, except that 13.6 µl of this modifying agent solution were employed instead of the modifying agent solution of Example 6-1, an acryloyl-modified goat anti-C-reactive protein antibody represented by the formula (11) given below was obtained. By determining the modifying degree of this acryloyl-modified antibody in the same manner as in Example 6-1, the value was found to be 8.0% and n was 7.2. By comparing the molecular weight of the acryloyl-modified antibody with that of the unmodified antibody, it was confirmed that no molecular multiplication of the acryloyl-modified antibody due to association, polymerization or the like had occurred.

(in which A represents the residue of goat anti-C-reactive protein antibody and n is a numeral of 7.2)

EXAMPLE 6-4

Preparation of Styryl-Modified Antibody

By dissolving p-styrenesulfonic acid chloride in dewatered 1,4-dioxane, a solution of a modifying agent of a concentration of 50 mg/ml was obtained. In the same manner as in Example 6-1, except that 15.2 µl of this modifying agent solution were employed instead of the modifying agent solution of Example 6-1, a styryl-modified goat anti-C-reactive protein antibody represented by the formula (12) given below was obtained. By determining the modifying degree of this styryl-modified antibody in the same manner as in Example 6-1, the value was found to be 7.7% and n was 6.9. By comparing the molecular weight of the styryl-modified antibody with that of the unmodified antibody, it was confirmed that no molecular multiplication of the styryl-modified antibody due to association, polymerization or the like had occurred.

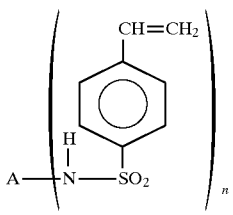

(in which A denotes the residue of goat anti-C-reactive protein antibody and n is a numeral of 6.9)

EXAMPLE 7-1

By dissolving the maleimido-modified goat anti-C-reactive protein antibody prepared in Example 6-1 in a buffer solution of 100 mM disodium hydrogenphosphate/sodium dihydrogenphosphate (pH 6.0), a solution of modified antibody monomer having a concentration of 25 mg/ml was obtained. Separately, methacrylamide as the other comonomer was dissolved in the phosphate buffer mentioned above to obtain a methacrylamide solution of a concentration of 160.0 mg/ml. Further, a solution of 2,2'-azobis[2-(2-imidazolin-2-yl)-propane]dihydrochloride as the radical polymerization initiator of a concentration of 7.2 mg/l was prepared by dissolving it in the phosphate buffer mentioned above.

To 800 µl of the above solution of the modified antibody monomer, 100 µl of the above methacrylamide solution and 100 µl of the above initiator solution were admixed. The resulting mixed liquor was incubated in the dark under a nitrogen atmosphere at 35° C. for 3 days while shaking, in order to effect copolymerization of the modified antibody monomer with methacrylamide. After the reaction, the reaction liquor was subjected to dialysis against 100 ml of a buffer solution of 30 mM disodium hydrogen-phosphate/sodium dihydrogenphosphate (pH 7.5) at 4° C. in the dark to remove the initiator.

After the dialysis, the dialyzed reaction liquor was assayed on a column composed of two segments filled with TSK-GEL G40000SWXL (trademark, a product of the firm TOSOH) and with TSK-GEL G3000SWXL (trademark, a product of the firm TOSOH), respectively, connected in series in this order. Namely, a sample of the dialyzed reaction liquor was passed through the column which had been equilibrated with a buffer solution of 0.3M NaCl and 50 mM disodium hydrogenphosphate/sodium dihydrogenphosphate (pH 7.0) under the condition of a flow rate of 1.0 ml/min, a column temperature of 40° C., a sample volume of 50 µl and a sample concentration of 1.0 mg/ml, whereby a peak is confirmed at a portion above thyroglobulin (MW=669,000), proving that a co-polymerized product of the antibody was produced.

EXAMPLE 7-2

The procedures of Example 7-1 were followed except that the methacryloyl-modified antibody obtained in Example 6-2 was employed as the modified antibody monomer, whereby a peak was confirmed at a portion above thyroglobulin (MW=669,000), proving that a co-polymerized product of the antibody was produced.

EXAMPLE 7-3

The procedures of Example 7-1 were followed except that the acryloyl-modified antibody obtained in Example 6-3 was employed as the modified antibody monomer and that 100 µl of an acrylamide solution of a concentration of 133.6 mg/ml was used instead of the methacrylamide solution, whereby a peak was confirmed at a portion above thyroglobulin (MW=669,000), proving that a co-polymerized product of the antibody was produced.

EXAMPLE 7-4

The procedures of Example 7-1 were followed except that the styryl-modified antibody monomer obtained in Example 6-4 was employed as the modified antibody monomer, whereby a peak was confirmed at a portion above thyroglobulin (MW=669,000), proving that a co-polymerized product of the antibody was produced.

EXAMPLE 8-1

By dissolving the maleimido-modified goat anti-C-reactive protein antibody monomer prepared in Example 6-1 in a buffer solution of 100 mM disodium hydrogenphosphate/sodium dihydrogenphosphate (pH 6.0), a solution of modified antibody monomer of a concentration of 25 mg/ml was obtained. Separately, a solution of 2,2'-azobis[2-(2-imidazolin-2-yl)propane]dihydrochloride as the radical polymerization initiator of a concentration of 2.0 mg/ml was prepared by dissolving it in the phosphate buffer mentioned above.

To 800 µl of the above solution of the modified antibody monomer, 200 µl of the above initiator solution were admixed. This mixed liquor was incubated in the dark under a nitrogen atmosphere at 35° C. for 3 days while shaking, in order to effect polymerization of the modified antibody monomer. After the reaction, the reaction liquor was subjected to dialysis against 100 ml of a buffer solution of 30 mM disodium hydrogenphosphate/sodium dihydrogenphosphate (pH 7.5) at 4° C. in the dark to remove the initiator.

After the dialysis, an assay was effected in the same manner as in Example 7-1, whereby a peak is confirmed at a portion above ferritin (MW=440,000) and below thyroglobulin (MW=669,000), proving that a polymerized product of the antibody was produced.

EXAMPLE 8-2

The procedures of Example 8-1 were followed except that the methacryloyl-modified antibody monomer obtained in Example 6-2 was employed as the modified antibody monomer, whereby a peak is confirmed at a portion above ferritin (MW=440,000) and below thyroglobulin (MW=669,000), proving that a polymerized product of the antibody was produced.

EXAMPLE 8-3

The procedures of Example 8-1 were followed except that the acryloyl-modified antibody monomer obtained in Example 6-3 was employed as the modified antibody monomer, whereby a peak is confirmed at a portion above ferritin (MW=440,000) and below thyroglobulin (MW=669,000), proving that a polymerized product of the antibody was produced.

EXAMPLE 8-4

The procedures of Example 8-1 were followed except that the styryl-modified antibody monomer obtained in Example 6-4 was employed as the modified antibody monomer, whereby a peak is confirmed at a portion above ferritin (MW=440,000) and below thyroglobulin (MW=669,000), proving that a polymerized product of the antibody was produced.

EXAMPLE 9-1

Using a biochemical automatic analyzer [Hitachi 7070 Autoanalyzer (trade name) of Hitachi Ltd.], an assay of C-reactive protein (CRP) was carried out by turbidimetry. First, 20 μl of a standard serum solution (of a concentration of 0 mg/dl, 0.05 mg/dl, 0.2 mg/dl or 0.8 mg/dl, respectively, prepared each by adding a corresponding amount of CRP to a solution deprived of CRP preliminarily and 300 μl of reagent 1 given in Table 2 below were mixed together and the resulting mixture was incubated at 37° C. for 5 minutes. Then, 50 μl of reagent 2 given in Table 2, which contains the goat anti-CRP antibody-copolymer prepared in Example 7-1, were added to the incubated liquor. This mixture was then further incubated at 37° C. for 5 minutes to effect the corresponding antigen-antibody reaction. Thereafter, the reaction liquor was examined by its absorbances at a principal wave length of 340 nm and at a subsidiary wave length of 700 nm, whereupon the difference between the observed two values was recorded as the "determined count" (340 nm–700 nm). The value of determined count for each CRP concentration was recited in Table 3.

EXAMPLE 9-2 to 9-4

The procedures of Example 9-1 were followed except that the goat anti-CRP antibody-copolymer prepared in Example 7-2, Example 7-3 or Example 7-4 was used instead of the goat anti-CRP antibody-polymer prepared in Example 7-1. The results are recited in Table 3.

EXAMPLE 10-1 to 10-4

The procedures of Example 9-1 were followed except that the goat anti-CRP antibody-polymer prepared in Example 8-1, Example 8-2, Example 8-3 or Example 8-4 was used instead of the goat anti-CRP antibody-copolymer prepared in Example 7-1. The results are recited in Table 3.

COMPARATIVE EXAMPLE 2

The procedures of Example 9-1 were followed except that non-polymerized original goat anti-CRP antibody was used instead of the goat anti-CRP antibody-copolymer. The results are recited in Table 3.

TABLE 2

| Reagent | Composition | concentration |
|---|---|---|
| Reagent 1 | Sodium chloride | 0.15 M |
| | Surfactant*[1] | appropriate |
| | Sodium azide | 0.3 mg/ml |
| | Phosphate buffer (pH 7.5) | 30.0 mM |
| Reagent 2 | Sodium chloride | 0.15 M |
| | Surfactant*[1] | appropriate |
| | Sodium azide | 0.3 mg/ml |
| | Anti-CRP-antibody*[2] | 8.0 mg/ml |
| | Phosphate buffer (pH 7.5) | 30.0 mM |

*[1]MACROGOL 6000 (trademark) of NOF Corporation (a polyethylene glycol, MW = 8,800)
*[2]The anti-CRP antibody-(co)polymer prepared in either one of Examples 7-1 to 7-4 and 8-1 to 8-4 or the non-polymerized original anti-CRP antibody

TABLE 3

| Average value of determined count for | CRP concentration (mg/dl) | | | |
|---|---|---|---|---|
| | 0.0 | 0.05 | 0.2 | 0.8 |
| Example 9-1 | 56 | 186 | 322 | 638 |
| Example 9-2 | 60 | 191 | 316 | 627 |
| Example 9-3 | 58 | 189 | 318 | 630 |

TABLE 3-continued

| Average value of determined count for | CRP concentration (mg/dl) | | | |
|---|---|---|---|---|
| | 0.0 | 0.05 | 0.2 | 0.8 |
| Example 9-4 | 59 | 191 | 328 | 640 |
| Example 10-1 | 54 | 91 | 179 | 543 |
| Example 10-2 | 55 | 89 | 180 | 538 |
| Example 10-3 | 56 | 92 | 182 | 542 |
| Example 10-4 | 57 | 94 | 186 | 550 |
| Compar. Example 2 | 55 | 68 | 142 | 437 |

From Table 3, it is seen that the determined count values for Examples using the assay reagent containing the goat anti-CRP antibody-(co)polymer are evidently higher as compared with the value for Comparative Example 2 using the assay reagent containing the goat anti-CRP antibody not subjected to polymerization. This indicates that assay of antigen can be realized with a high sensitivity.

EXAMPLE 11-1

Preparation of Maleimido-Modified β-D-Galactosidase

A solution of an enzyme of a concentration of 10 mg/ml was prepared by dissolving a β-D-galactosidase (MW: ca. 540,000) in 100 mM disodium hydrogenphosphate/sodium dihydrogenphosphate buffer solution (pH 6.0). Separately, N,N'-o-phenylenedimaleimide was dissolved in dimethylformamide to obtain a solution of modifying agent of a concentration of 5 mg/ml. 9.9 μl of this modifying agent solution were admixed with 1,000 μl of the above-mentioned enzyme solution and the mixture was incubated in the dark at 30° C. for 30 minutes to thereby cause the reaction of the thiol group in the β-D-galactosidase with N,N'-o-phenylenedimaleimide.

After the reaction, the reaction liquor was subjected to fractionation by passing it through a column (column size: 13 mm inner diameter×390 mm) filled with Sephadex-G25 (trademark, a product of the firm Pharmacia LKB Biotechnology), which was equilibrated by a buffer solution of 100 mM disodium hydrogenphosphate/sodium dihydrogenphosphate (pH 6.0), at a flow rate of 0.5 ml/min (fraction volume=1.0 ml/fraction). By observing the absorbance of each fraction at 280 nm, the peaks for the maleimido-modified β-D-galactosidase and for the unreacted N,N'-o-phenylenedimaleimide, respectively, were confirmed, proving that the maleimido-modified β-D-galactosidase represented by the following formula (13) was produced:

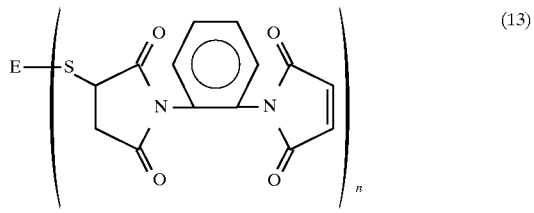

(in which E represents the residue of β-D-galactosidase and n=6.7)

Determining the number of maleimide groups per molecule of β-D-galactosidase (mole/mole) by a method using 4,4'-dithiopyridine, a value of 6.7 was obtained.

The resulting product of maleimido-modified β-D-galactosidase was concentrated up to 25 mg/ml by ultrafiltration.

The maleimido-modified β-D-galactosidase was subjected to a sodium dodecyl sulfate-polyacrylamide gel electrophoresis (SDS-PAGE). By comparing the molecular weight of the maleimido-modified β-D-galactosidase with that of the unmodified β-D-galactosidase, it was confirmed that no molecular multiplication of the maleimido-modified β-D-galactosidase due to association, polymerization, or the like had occurred.

EXAMPLE 11-2

Preparation of Maleimido-Modified Anti-Mouse Antibody

A solution of an antibody of a concentration of 50 mg/ml was prepared by dissolving an anti-mouse antibody (MW= ca. 150,000) in 100 mM sodium carbonate/sodium bicarbonate buffer solution (pH 9.0). Separately, N-(6-maleimidocaproyloxy)succinimide (EMCS: trademark, a product of the firm Dojin Chemical) was dissolved in dimethylformamide to obtain a solution of modifying agent of a concentration of 50 mg/ml. 23.1 μl of this modifying agent solution were admixed with 1,200 μl of the above-mentioned antibody solution and the mixture was incubated in the dark at 4° C. for 12 hours, to thereby cause the reaction of the free amino group in the antibody with EMCS.

After the reaction, the reaction liquor was subjected to fractionation in the same manner as in Example 11-1. By observing the absorbance of each fraction at 280 nm, the peaks for the maleimido-modified anti-mouse antibody and for the unreacted EMCS, respectively, were confirmed. By collecting the Nos. 22–33 fractions, the maleimido-modified anti-mouse antibody represented by the formula (14) given below was obtained.

The proportion of formation of amido bond by the modifiable free amino groups in the antibody with EMCS (modifying degree in %) was determined by the method of quantitative assay of free amino group [Analytical Biochemistry, 14, 328–336 (1966)]. Here, a glycine solution was employed as the standard solution and the modifying degree of unmodified antibody was taken to be zero %. It was determined thereby that the modifying degree is 8.0% and n is 7.20.

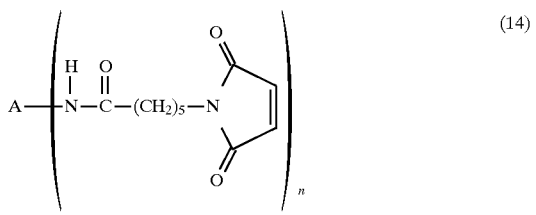

(14)

(in which A represents the residue of anti-mouse antibody and n=7.20)

The molecular weight of the resulting maleimido-modified anti-mouse antibody was compared with that of the unmodified anti-mouse antibody in the same manner as in Example 11-1, whereby it was confirmed that no molecular multiplication due to association, polymerization, or the like had occurred.

EXAMPLE 12

Preparation of Antibody/Enzyme-Copolymer

An antibody/enzyme-copolymer was prepared by using (1) the solution of maleimido-modified β-D-galactosidase (in the following, denoted sometimes as the galactosidase monomer) of a concentration of 25 mg/ml obtained in Example 11-1, (2) the solution of maleimido-modified anti-mouse antibody (in the following, denoted sometimes as the antibody monomer) of a concentration of 25 mg/ml obtained in Example 11-2 and (3) the monomer solution as well as (4) the initiator solution prepared as follows. Namely, methacrylamide and 2,2'-azobis[2-(imidazolin-2-yl)-propane] dihydrochloride were dissolved separately in a buffer solution of 100 mM disodium hydrogenphosphate/sodium dihydrogenphosphate (pH 6.0) to obtain a methacrylamide solution of 200.0 mg/ml and an initiator solution of 4.0 mg/ml, respectively.

Then, 800 μl of the above galactosidase monomer solution, 4 μl of the antibody monomer solution, 100 μl of the above methacrylamide solution and 100 μl of the above initiator solution were mixed together. The resulting mixed liquor was incubated in the dark under nitrogen atmosphere at 35° C. for 3 days while shaking, in order to effect the copolymerization. After the reaction, the reaction liquor was subjected to dialysis against 100 ml of 30 mM disodium hydrogenphosphate/sodium dihydrogenphosphate buffer solution (pH 7.5) at 4° C. in the dark to remove the initiator.

After the dialysis, the dialyzed reaction liquor was assayed on a column composed of two segments filled with TSK-GEL G4000SWXL (trademark, a product of the firm TOSOH) and with TSK-GEL G3000SWXL (trademark, a product of the firm TOSOH), respectively, connected in series in this order. Namely, a sample of the dialyzed reaction liquor was passed through the column which had been equilibrated with a buffer solution of 0.3M NaCl and 50 mM disodium hydrogenphosphate/sodium dihydrogenphosphate (pH 7.0), under the condition of a flow rate of 1.0 ml/min, a column temperature of 40° C., a sample volume of 50 μl and a sample concentration of 1.0 mg/ml, whereby a peak was confirmed at a portion between Blue Dextran (MW=2,000,000) and thyroglobulin (MW=669,000), proving that an antibody/enzyme-copolymer was produced.

EXAMPLE 13

Assay of Mouse Antibody

A solution of an anti-mouse antibody of a concentration of 5.0 μg/ml was prepared by dissolving an anti-mouse antibody (Anti Mouse IgG) in 100 mM disodium hydrogenphosphate/sodium dihydrogenphosphate buffer solution (pH 7.5). Each 100 μl of this solution were placed in each well of a titer plate [Maxisorp F96 (trademark) of the firm NUNC] and were incubated at 4° C. for 12 hours to thereby fix the anti-mouse antibody on the titer plate. Then, each well was washed three times using 10 mM disodium hydrogenphosphate/sodium dihydrogenphosphate buffer solution (pH 7.5) containing 0.5% of Tween 20 and 150 mM NaCl. Thereafter, 300 μl of a buffer solution of 10 mM disodium hydrogenphosphate/sodium dihydrogenphosphate (pH 7.5) containing added thereto 5% bovine serum albumin, 0.5% Tween 20 and 150 mM NaCl were added to each well, whereupon the solution in each well was incubated at 25° C. for 2 hours to subject the titer plate to blocking, before the incubated solution in each well was removed by decantation.

Six sample solutions of a mouse antibody (Mouse IgG) were prepared so as to adjust the concentration of each solution to be 0, 2, 10, 50, 250 or 1250 fmol/ml respectively. Namely, the mouse antibody was added to a buffer solution of 10 mM disodium hydrogenphosphate/sodium dihydrogenphosphate (pH 7.5) containing added thereto 5% bovine serum albumin, 0.5% Tween 20 and 150 mM sodium chloride, so as to reach the above-mentioned respective concentration. Each 100 μl of the so-prepared sample solutions was placed in each of 16 wells of a titer plate and incubated at 25° C. for 30 minutes, to thereby form a complex of anti-mouse antibody/mouse antibody by the antigen-antibody reaction. Thereafter, each well was washed three times using a buffer solution of 10 mM disodium hydrogenphosphate/sodium hydrogenphosphate (pH 7.5) containing 0.5% Tween 20 and 150 mM NaCl.

Then, each 100 μl of a diluted solution of the antibody/enzyme-copolymer obtained in Example 12 (diluted 1,000-fold with a buffer solution of 10 mM disodium hydrogenphosphate/sodium dihydrogenphosphate (pH 7.5) containing added thereto 5% bovine serum albumin, 0.5% Tween 20 and 150 mM NaCl) was added to each well, whereupon the solution in each well was incubated at 25° C. for 30 minutes to thereby cause an antigen-antibody reaction between the anti-mouse antibody/mouse antibody complex and the antibody/enzyme-copolymer. Thereafter, each well was washed three times with a buffer solution of 10 mM disodium hydrogenphosphate/sodium dihydrogenphosphate (pH 7.5) containing added thereto 0.5% Tween 20 and 150 mM NaCl.

Then, each 100 μl of a 25 mM solution of 2-nitro-phenyl-β-D-galactopyranoside as a substrate of β-D-galactosidase, prepared by dissolving the above substrate in a buffer solution of 10 mM disodium hydrogenphosphate/sodium dihydrogenphosphate (pH 7.5) containing 100 mM NaCl, 0.1% bovine serum albumin and 1 mM $MgCl_2$, were added to each well and were incubated at 35° C. for 10 minutes to cause the enzyme/substrate reaction. Then, each 100 μl of 200 mM sodium carbonate solution was added to each well, whereupon the light absorbance of each solution in the well at 410 nm was observed using Micro Plate Reader. The test results, such as the absorbance of each sample of respective concentration, average value, standard deviation (SD) and CV value (%) etc., are summarized in Table 4.

TABLE 4

(Example 13)

Concentration of the mouse antibody (fmol/ml)

|  | 0 | 2 | 10 | 50 | 250 | 1250 |
|---|---|---|---|---|---|---|
| Light | 0.040 | 0.115 | 0.174 | 0.356 | 0.695 | 1.128 |
| absor- | 0.053 | 0.099 | 0.183 | 0.346 | 0.681 | 1.184 |
| bance | 0.058 | 0.095 | 0.171 | 0.309 | 0.680 | 1.109 |
|  | 0.049 | 0.118 | 0.157 | 0.340 | 0.668 | 1.284 |
|  | 0.050 | 0.110 | 0.160 | 0.358 | 0.663 | 1.273 |
|  | 0.052 | 0.113 | 0.154 | 0.321 | 0.642 | 1.154 |
|  | 0.036 | 0.108 | 0.176 | 0.310 | 0.628 | 1.246 |
|  | 0.053 | 0.113 | 0.159 | 0.357 | 0.695 | 1.124 |
|  | 0.042 | 0.126 | 0.184 | 0.363 | 0.707 | 1.130 |
|  | 0.061 | 0.113 | 0.182 | 0.308 | 0.632 | 1.158 |
|  | 0.052 | 0.109 | 0.184 | 0.315 | 0.699 | 1.178 |
|  | 0.059 | 0.115 | 0.194 | 0.325 | 0.680 | 1.240 |
|  | 0.052 | 0.108 | 0.192 | 0.365 | 0.668 | 1.094 |
|  | 0.049 | 0.124 | 0.167 | 0.314 | 0.663 | 1.149 |
|  | 0.050 | 0.092 | 0.162 | 0.356 | 0.642 | 1.218 |
|  | 0.033 | 0.124 | 0.191 | 0.366 | 0.711 | 1.312 |
| Max. | 0.061 | 0.126 | 0.194 | 0.366 | 0.711 | 1.312 |
| Min. | 0.033 | 0.092 | 0.154 | 0.308 | 0.628 | 1.094 |
| Aver. | 0.0493 | 0.1114 | 0.1744 | 0.3381 | 0.6721 | 1.1863 |
| SD | 0.0079 | 0.0098 | 0.0133 | 0.0227 | 0.0262 | 0.0676 |
| 2SD | 0.0158 | 0.0196 | 0.0267 | 0.0453 | 0.0523 | 0.1352 |
| CV (%) | 16.0 | 8.8 | 7.7 | 6.7 | 3.9 | 5.7 |

COMPARATIVE EXAMPLE 3

The procedures of Example 13 were followed except that a β-D-galactosidase-labelled anti-mouse antibody was used instead of the antibody/enzyme-copolymer. The results are summarized in Table 5.

TABLE 5

(Compar. Example 3)

Concentration of the mouse antibody (fmol/ml)

|  | 0 | 2 | 10 | 50 | 250 | 1250 |
|---|---|---|---|---|---|---|
| Light | 0.037 | 0.035 | 0.071 | 0.114 | 0.308 | 0.539 |
| absor- | 0.046 | 0.052 | 0.052 | 0.124 | 0.340 | 0.596 |
| bance | 0.057 | 0.062 | 0.053 | 0.104 | 0.340 | 0.656 |
|  | 0.046 | 0.061 | 0.089 | 0.115 | 0.334 | 0.667 |
|  | 0.047 | 0.054 | 0.044 | 0.112 | 0.308 | 0.692 |
|  | 0.053 | 0.057 | 0.066 | 0.104 | 0.321 | 0.581 |
|  | 0.025 | 0.053 | 0.049 | 0.134 | 0.277 | 0.627 |
|  | 0.053 | 0.025 | 0.056 | 0.109 | 0.354 | 0.617 |
|  | 0.039 | 0.047 | 0.052 | 0.119 | 0.305 | 0.518 |
|  | 0.045 | 0.057 | 0.082 | 0.122 | 0.313 | 0.576 |
|  | 0.053 | 0.069 | 0.057 | 0.114 | 0.360 | 0.586 |
|  | 0.044 | 0.047 | 0.072 | 0.119 | 0.297 | 0.617 |
|  | 0.057 | 0.033 | 0.062 | 0.136 | 0.348 | 0.544 |
|  | 0.047 | 0.068 | 0.054 | 0.136 | 0.348 | 0.692 |
|  | 0.052 | 0.053 | 0.084 | 0.112 | 0.302 | 0.606 |
|  | 0.035 | 0.022 | 0.049 | 0.115 | 0.338 | 0.644 |
| Max. | 0.057 | 0.069 | 0.089 | 0.136 | 0.360 | 0.692 |
| Min. | 0.025 | 0.022 | 0.044 | 0.104 | 0.277 | 0.518 |
| Aver. | 0.0460 | 0.0497 | 0.0620 | 0.1181 | 0.3246 | 0.6099 |
| SD | 0.0087 | 0.0142 | 0.0139 | 0.0102 | 0.0239 | 0.0523 |
| 2SD | 0.0173 | 0.0284 | 0.0277 | 0.0203 | 0.0478 | 0.1046 |
| CV (%) | 18.8 | 28.6 | 22.3 | 8.6 | 7.4 | 8.6 |

From Tables 4 and 5, it is seen that the assay with the conventional enzyme-labelled antibody in Comparative Example 3 permits detection of the samples of concentrations down to 50 fmol/ml, whereas the assay with the antibody/enzyme-copolymer according to the present invention in Example 13 allows detection of the samples of concentration down to 2 fmol/ml, indicating that an assay with a higher sensitivity can be attained using the assay reagent according to the present invention.

We claim:

1. A water-soluble polymerized product of protein, comprising a polymer containing one or more protein-containing monomers represented by the general formula $$P_r-[(Y)_k-(X)_m-R^1]_n \quad (1)$$

wherein $R^1$ represents maleimido or (meth)acrylamido, $P_r$ denotes an enzyme residue, Y denotes a group formed from a functional group in said enzyme and the functional group $R^2$ of the modifying agent given below, X denotes an organic divalent radical, k is zero or 1, m is zero or 1 and n is a numeral of 1 or higher, said protein-containing monomer being obtained by reacting an enzyme with a modifying agent represented by the general formula $$R^2-(X)_m-R^1 \quad (2)$$

wherein $R^2$ represents a functional group capable of combining with a functional group of the enzyme and $R^1$, X and m are as given above.

2. A water-soluble polymerized product of protein as claimed in claim 1, wherein the enzyme is a peptide hydrolase or an esterase and the polymerized product serves as a pollutant removing agent for contact lens.

3. A water-soluble polymerized product of protein, comprising a polymer containing one or more protein-containing monomers represented by the general formula $$P_r-[(Y)_k-(X)_m-R^1]_n \quad (1)$$

wherein $R^1$ represents maleimido or (meth)acrylamido, $P_r$ denotes a residue from an immunologically active substance, Y denotes a group formed from a functional group in said immunologically active substance and the functional group $R^2$ of the modifying agent given below, X denotes an organic divalent radical, k is zero or 1, m is zero or 1 and n is a numeral of 1 or higher, said protein-containing monomer being obtained by reacting an immunologically active substance with a modifying agent represented by the general formula $$R^2-(X)_m-R^1 \qquad (2)$$

wherein $R^2$ represents a functional group capable of combining with a functional group of the immunologically active substance and $R^1$, X and m are as given above.

4. A water-soluble polymerized product of protein as claimed in claim 3, wherein the polymerized product serves as an assay reagent for assaying an immunologically active substance.

5. A water-soluble polymerized product of protein as claimed in claim 4, wherein the polymerized product serves as an assay reagent in turbidimetry or nephelometry.

6. A water-soluble polymerized product of protein as claimed in claim 3, which comprises a copolymer of a monomer containing a first immunologically active substance and a monomer containing an enzyme and serves as an assay reagent for assaying a second immunologically active substance.

7. A water-soluble polymerized product of protein as claimed in claim 6, wherein the assay reagent is used for enzyme immunoassay.

* * * * *